Figure 1:
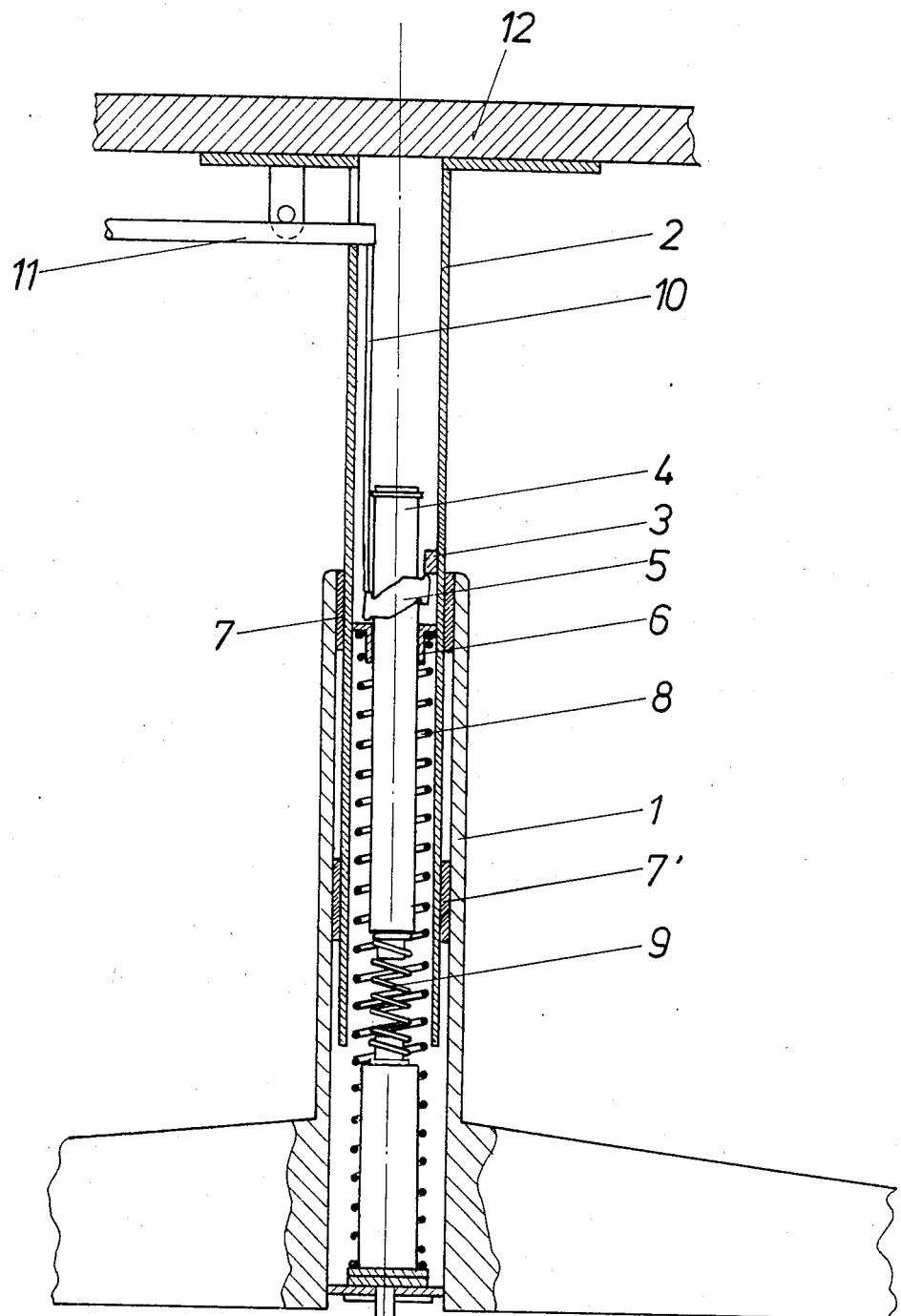

United States Patent [19]

Lundqvist

[11] Patent Number: 4,664,549
[45] Date of Patent: May 12, 1987

[54] LOCKING RING

[76] Inventor: Keld Lundqvist, L.F. Cortzensvej 31, Virum 2830, Denmark

[21] Appl. No.: 798,462

[22] PCT Filed: Feb. 21, 1985

[86] PCT No.: PCT/DK85/00100
§ 371 Date: Nov. 22, 1985
§ 102(e) Date: Nov. 22, 1985

[87] PCT Pub. No.: WO85/03746
PCT Pub. Date: Aug. 29, 1985

[30] Foreign Application Priority Data

Feb. 23, 1984 [DK] Denmark .................. 904/84

[51] Int. Cl.⁴ .................................. F16B 7/10
[52] U.S. Cl. ........................... 403/104; 248/410
[58] Field of Search ............ 248/410; 403/104; 292/306, 178, 349; 188/67

[56] References Cited

U.S. PATENT DOCUMENTS 3,195,531  7/1965  Groff .................. 248/410 X
3,584,821  6/1971  Glebe ................. 248/410 X

FOREIGN PATENT DOCUMENTS 75447    2/1953   Denmark .
674213   4/1939   Fed. Rep. of Germany ...... 248/410
2318796  4/1972   Fed. Rep. of Germany .
86246    3/1936   Sweden .................. 248/410
126404   10/1949  Sweden .................. 248/410
140643   6/1953   Sweden .
152278   11/1955  Sweden .
366366   4/1974   Sweden .
610674   10/1948  United Kingdom .

Primary Examiner—Andrew V. Kundrat
Attorney, Agent, or Firm—Merchant, Gould, Smith, Edell, Welter & Schmidt

[57] ABSTRACT

A locking ring is provided that is sized to fit about a cylindrical rod and having upper and lower edges cut away and opposed from each other along a diagonal intersecting a central axis of the ring.

4 Claims, 3 Drawing Figures

LOCKING RING

The invention relates to a locking ring of the kind being adapted to fit around and slide on a cylindrical rod or tube and which by the tilting thereof on an axis perpendicularly to the axis of the rod can be locked onto the rod.

Locking rings of this kind find many applications where it is desired to easily being able to release a connection between two parts. The tilted ring will hit the tube or the rod in two places—namely by the edges existing between the inner surface of the ring and the upper and lower surfaces, respectively, of the ring.

The specifications to Danish Pat. No. 75447 and to British Pat. No. 610,674 relates to devices of this kind.

Such locking rings work excellently by relatively small loads but the size of the two small surfaces where the ring lies true against the rod in its tilted position has the effect that the design is not good where the ring is for example under a comparatively heavy load while at the same having to be secured against displacement on the rod or tube. The contact surfaces are small and will often tend to cut into the tube so that this is damaged. It may also happen that the ring itself is deformed thus causing reduced locking power.

The object of the invention is therefore to provide a locking ring that is not encumbered with these drawbacks, ie. a locking ring which can stand comparatively heavy loads without being subjected to any substantial wear.

This is achieved according to the invention in that the areas of the inside of the ring that are most tilted by the movement thereof are designed with cutting edges of such shape that they will never come into contact with the rod before the tilting has been stopped by a squeezing in the areas close to the tipping axis.

By simply removing the areas where the ring would otherwise have come into contact with the tube by tilting, the ring will instead squeeze around the tube in areas situated more or less where the axis of tilting intersects the ring, ie. staggered approx. 90° in relation to the points where a non-cut ring would have hit the tube.

There is thus obtained a larger contact area by applying a squeezing force acting on two diametrically opposed areas of the rod and consequently such a locking ring can stand comparatively heavy loads without being subjected to any damages or wear. The squeezing force moreover facilitates the re-releasing of the connection because there is a high leverage.

It is obvious that the size of the cut-off part will have to be dimensioned to the clearance of the ring on the rod or tube so that the desired squeezing is obtained.

It is not necessary to cut away the entire upper or lower surfaces of the ring as disclosed where the upper cutting face extends between the upper surface and the vertical outer face of the ring and the lower cutting face extends between the lower surface and the vertical outer face of the ring. Thus, the remaining part of the upper and lower surfaces of the ring can be used as contact surfaces for for example means for tilting the ring and for reversing the tilting.

In most cases it will be simple to manufacture a ring where the two cutting faces are identical but mutually turned. For example, it is possible to manufacture the ring by machining same first from one side and then from the other with the same tools.

It is advantageous if a locking ring according to the invention is adapted to being locked by a pressure spring which may of itself tilt the ring.

Finally, a locking ring according to the invention may be characteristic in that the ring as well as the rod/tube have been tempered. There is thus obtained a locking ring which without any problems may be used for a long period of time and under heavy loads.

The invention moreover relates to the use of such a locking ring for locking by a pressure spring which may for example by used for a device for vertical adjustment of a chair or the like it being simple to produce a device which is springy in its locked position in this manner. Gas cylinders for this purpose are known but they are expensive and have limited durability. Such gas cylinders have moreover turned out to be dangerous since they may explode.

Contrary thereto a locking ring according to the invention will work satisfactorily for even very long time and the use thereof will also be less costly.

Figure 2:
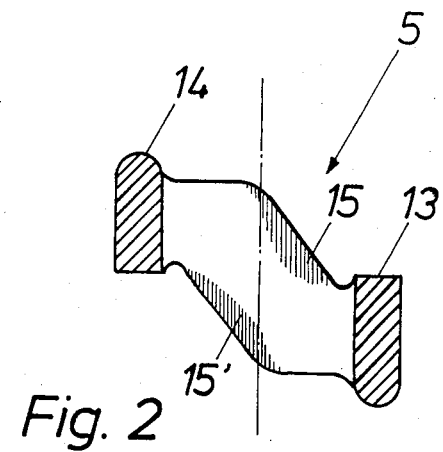
Figure 3:
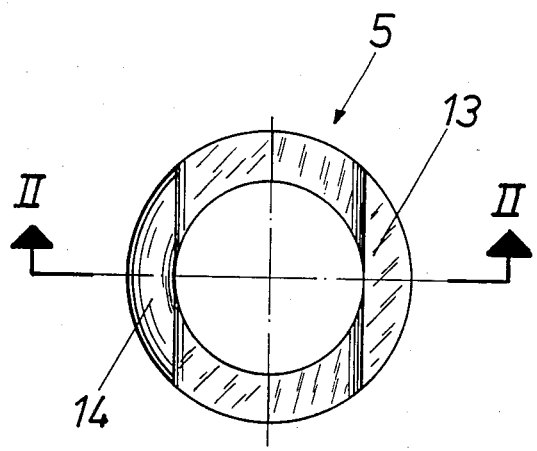

The invention will be further described in the following with reference to the drawing wherein FIG. 1 is a section through a chair where the locking ring according to the invention is used as a device for adjusting seat height, FIG. 2 is a section through a ring according to the invention seen in the direction of the arrows along line II—II in FIG. 3, and FIG. 3 is a top view of the ring shown in FIG. 2.

In FIG. 1 there is shown a swivel chair using in its adjustment device a locking ring according to the invention. This is by no means to be construed as if the invention is limited to use in connection with chairs but exclusively as an example.

The chair consists of a frame 1 having an upwardly protruding open tube. By means of linings 7, 7' a seat tube 2 supporting seat 12 of the chair is telescopically arranged in the frame tube 1. Resting on a spring 9 there is placed a tube 4 inside the chair. The spring 9 increases user comfort since it will serve to spring seat 12. Spring 9 moreover protects the device against hard loads for by the locking of the ring it will take up a great part of the load. This will reduce wear of the locking ring.

The tube 4 is surrounded by a sleeve 6 slideable thereon and which is connected with an adjusting spring 8 which is secured by the bottom of the frame. Seat tube 2 moreover has a stop 3.

Between stop 3 and sleeve 6 there is surrounding tube 4 arranged a ring 5 according to the invention forming together with tube 4 a locking ring according to the invention.

Opposite stop 3 the ring 5 is connected with a release mechanism 10 which can be actuated by a handle 11.

The mode of operation of the chair is as follows: When release mechanism 10 is not actuated, sleeve 6 will be pressed up by the action of spring 8 and by this action and the action of stop 3 tilt the ring which will squeeze onto tube 4. The seat 23 is now locked but will nevertheless be sprung by spring 9.

In order to lift or lower the seat 12 if so desired release mechanism 10 is actuated by handle 11. This will cause one side of ring 5 to be pressed down against the elastic force of spring 8 so that the ring is no longer tilted.

If the pressure on the seat is now relieved, spring 8 will press collar 6, ring 5 and stop 3 in an upwards direction. Seat 12 will thus be lifted which will be the case until handle 11 is again released when ring 5 will at once tilt.

The same is the case if the seat height is to be lowered. It will then be necessary to load the seal further in such a manner that spring 8 is compressed. This spring should moreover have a lifting power of approx. 45 kilos giving a swivel chair which can be used by almost all people with a grood result.

FIGS. 2 and 3 show a ring according to the invention in greater detail. Ring 5 is on its upper side provided with a horizontal face 13 serving as a contact face for the release mechanism. Diametrically opposite said face 13 there is a curved face 14 for contact against the underside of the stop. Faces 13 and 14 are generally opposite each other along a diagonal which intersects the axis line (unnumbered) at a midpoint through the ring.

Hatchings 15, 15' inside ring 5 suggest where the ring squeezes around the rod. Of course there are two similar areas opposite the two areas shown.

A locking ring according to the invention is advantageously made of metal and particularly of tempered steel. However, the use of other softer materials may come into question if conditions speak therefor for example in case of poor loads.

The shown embodiment has proved to function excellently in a swivel chair. It is, however, within the scope of the invention to design particularly the ring in many different ways according to its intended use. It is merely important that a sufficient amount of material is cut away in relation to the clearance between ring and rod so that the desired squeezing effect is obtained. This means that so much material will have to be cut away that the ring will squeeze onto the tube before any other part of the ring comes into contact with the tube.

In many cases it will be more advantageous to use a tube rather than a rod because the tube may be slightly springy and this will reduce wear. Furthermore, the spring effect will help to re-release the connection. It is obvious that great deformations of tempered steel tubes will not occur but even a deformation of a few hundredth of a millimeter may be of importance.

I claim:

1. A locking ring which is sized to fit about a cylindrical rod and having a median plane with a central axis lying therein, comprising:

a body member having first and second sides on either side of the plane and an aperture sized to receive said rod, and upper and lower edges being diametrically opposed from each other on said first and second sides respectively generally along a diagonal intersecting said axis, said body member having first portions cut away on said second side directly across from said upper edge and second portions cut away on said first side directly across from said lower edge, said body being tiltable generally about an axis normal to said central axis, so that said ring will squeeze around said rod in areas where the axis of tilting intersects the ring.

2. A locking ring according to claim 1 wherein said edges are symmetric about the tilting axis.

3. A locking ring according to claim 1 including a spring located adjacent one of said edges and positioned to bias said edge toward the rod.

4. A locking ring according to claim 3 wherein said upper edge has a top surface and said lower edge has a bottom surface and said spring contacts one of said surfaces and including stop means positioned to contact said other surface and release means capable of biasing said ring against the force of said spring.

* * * * *